(12) United States Patent
Grönqvist et al.

(10) Patent No.: US 12,391,523 B2
(45) Date of Patent: Aug. 19, 2025

(54) SETTING OPERATIONAL WORK MODES BASED ON EQUIPMENT LIFESPAN

(71) Applicant: Hiab AB, Malmö (SE)

(72) Inventors: Hanna Grönqvist, Helsinki (FI); Mikko Kursula, Lempäälä (FI)

(73) Assignee: Hiab AB, Malmö (SE)

(*) Notice: Subject to any disclaimer, the term of this patent is extended or adjusted under 35 U.S.C. 154(b) by 444 days.

(21) Appl. No.: 18/068,303

(22) Filed: Dec. 19, 2022

(65) Prior Publication Data
US 2023/0192456 A1    Jun. 22, 2023

(30) Foreign Application Priority Data
Dec. 21, 2021    (EP) ..................... 21216314

(51) Int. Cl.
*B66C 13/48*    (2006.01)
*B66C 13/46*    (2006.01)
(Continued)

(52) U.S. Cl.
CPC .......... *B66C 13/48* (2013.01); *G05B 19/4155* (2013.01); *B66C 23/88* (2013.01); *G05B 2219/45046* (2013.01)

(58) Field of Classification Search
None
See application file for complete search history.

(56) References Cited

U.S. PATENT DOCUMENTS

| | | | |
|---|---|---|---|
| 5,337,982 A * | 8/1994 | Sherry | G05D 1/0607 701/8 |
| 5,531,122 A | 7/1996 | Chatham | |

(Continued)

FOREIGN PATENT DOCUMENTS

| | | | |
|---|---|---|---|
| CN | 1867932 A * | 11/2006 | G06F 19/00 |
| CN | 111874813 A | 11/2020 | |

(Continued)

OTHER PUBLICATIONS

Aguilar et al., "Nonlinear modeling and robust LMI fuzzy control of overhead crane systems", Apr. 2019, Journal of the Franklin Institute 358 (2021) 1376-1402. (Year: 2019).*

(Continued)

*Primary Examiner* — Mohammad Ali
*Assistant Examiner* — Kelvin Booker
(74) *Attorney, Agent, or Firm* — Renner, Otto, Boisselle & Sklar, LLP.

(57) ABSTRACT

Working equipment system includes a working equipment, a control unit, a monitoring unit, and a processing unit. The monitoring unit is configured to receive a first data set including predefined equipment data, a second data set including operation data based on sensor signals, a unique identifier for the working equipment, and a time stamp for the second data set. The processing unit is configured to calculate a time series of wear indicator values based on the stored first and second data sets, to estimate a predicted lifetime of the working equipment by extrapolating the indicator values, to compare the predicted lifetime with a target lifetime, and to select an operation mode in dependence of the comparison such that the predicted lifetime corresponds to the target lifetime. The processing unit is configured to transmit the selected operation mode to the control unit that is configured to apply the selected operation mode.

14 Claims, 4 Drawing Sheets

(51) Int. Cl.
*B66C 23/88* (2006.01)
*G05B 19/41* (2006.01)
*G05B 19/4155* (2006.01)

(56) References Cited

U.S. PATENT DOCUMENTS

| | | | | |
|---|---|---|---|---|
| 6,205,409 | B1 * | 3/2001 | Zvonar | G01F 25/00 |
| | | | | 700/282 |
| 6,405,108 | B1 * | 6/2002 | Patel | G06F 11/2257 |
| | | | | 701/19 |
| 8,260,736 | B1 * | 9/2012 | Lear | G06N 5/02 |
| | | | | 706/46 |
| 9,199,825 | B2 | 12/2015 | Dueckman | |
| 11,373,455 | B2 * | 6/2022 | Brim | G05B 23/0283 |
| 2009/0099866 | A1 | 4/2009 | Newman | |
| 2015/0193325 | A1 * | 7/2015 | Harsan-Farr | G06F 11/008 |
| | | | | 702/186 |
| 2016/0239743 | A1 * | 8/2016 | Hwang | E02B 17/00 |
| 2016/0283443 | A1 * | 9/2016 | Michalscheck | G05B 19/41875 |
| 2016/0378628 | A1 * | 12/2016 | Nguyen | G06F 11/008 |
| | | | | 714/40 |
| 2017/0372534 | A1 | 12/2017 | Steketee | |
| 2018/0017467 | A1 * | 1/2018 | Hiruta | G05B 23/0254 |
| 2019/0137350 | A1 * | 5/2019 | Guru | H02P 6/10 |
| 2021/0157312 | A1 * | 5/2021 | Cella | G01M 13/045 |
| 2021/0199110 | A1 * | 7/2021 | Albert | G05B 23/0283 |
| 2021/0389276 | A1 * | 12/2021 | Toft | F03D 17/00 |
| 2022/0108262 | A1 * | 4/2022 | Cella | G05B 17/02 |
| 2022/0187819 | A1 * | 6/2022 | Shalaby | G06F 18/214 |

FOREIGN PATENT DOCUMENTS

| | | | | |
|---|---|---|---|---|
| EA | 011102 B1 | * | 12/2008 | G06Q 90/00 |
| EP | 3791236 A1 | | 3/2021 | |
| JP | 2005231827 A | * | 9/2005 | B66C 13/00 |
| JP | 4459650 B2 | * | 4/2010 | B66C 13/00 |
| KR | 102299554 B1 | * | 9/2021 | G01R 31/327 |
| WO | 2006116758 A2 | | 11/2006 | |
| WO | WO-2014044906 A1 | * | 3/2014 | G06Q 10/06 |
| WO | 2019216975 A1 | | 11/2019 | |
| WO | 2020256614 A1 | | 12/2020 | |
| WO | 2021108680 A1 | | 6/2021 | |

OTHER PUBLICATIONS

Schaper et al., "Constrained real-time model-predictive reference trajectory planning for rotary cranes", Jul. 2013, IEEE/ASME International Conference on Advanced Intelligent Mechatronics (AIM) Wollongong, Australia, Jul. 9-12, 2013. (Year: 2013).*

Kuchler et al., "Active Control for an Offshore Crane Using Prediction of the Vessel's Motion", Feb. 2009, IEEE/ASME Transactions on Mechatronics, vol. 16, No. 2, Apr. 2011. (Year: 2009).*

Wiethorn et al., "Tower Crane Life Expectancy an Examination of Recent Trends to Establish Age Limits", Jan. 2015, Haag Engineering Co. (Year: 2015).*

* cited by examiner

SETTING OPERATIONAL WORK MODES BASED ON EQUIPMENT LIFESPAN

This application claims priority of European Application No. 21216314.1, filed Dec. 21, 2021, which is hereby incorporated herein by reference in its entirety.

TECHNICAL FIELD

The present disclosure relates to a working equipment system, and a method of the working equipment system, and in particular to customization of working equipment automation parameters based on data insight on equipment wear.

BACKGROUND

This disclosure addresses the problem of wear through physical stress and strain on heavy duty working equipment. The working equipment may be truck mounted cranes, mobile cranes, forestry machines, excavators, loaders, mining equipment etc. The structure and parts, herein denoted structural parts, of working equipment are subject to wear when used. Herein, by wear is meant material fatigue defined as the initiation and propagation of cracks in a material due to cyclic loading. In this disclosure we do not consider wear originating from external factors such as climate but instead from the maneuvering of the equipment, whether it be done by a human or autonomously.

More particularly, by structural part of a working equipment is meant e.g. crane booms, crane columns, hydraulic cylinders, hydraulic actuators, telescopic extensions, etc. By structural part is not meant bearings, slide parts, etc., i.e. parts subjected to wear that will be replaced, amended and/or handled during normal service of the working equipment.

Mobile working equipment are operated in widely varying operational settings around the world. However varying these conditions may be, there is a need for objective quality control of operations. The maneuvers done using the equipment have a significant impact on the quality as any rapid or discontinuous movement exerts a high degree of stress that can be measured e.g. through the pressure at different parts of the equipment hydraulic system. High gradients and other characterizable patterns in the hydraulic pressure can be aggregated into measures of wear, and these may further be combined with input from sensors such as inclinometers, angle sensors, length sensors like wire sensors etc.

Some patent document disclosing related art will now be identified and briefly discussed. EP3791236A1 discloses an industrial machine predictive maintenance system may include an industrial machine data analysis facility that generates streams of industrial machine health monitoring data by applying machine learning to data representative of conditions of portions of industrial machines received via a data collection network. The system may include an industrial machine predictive maintenance facility that produces industrial machine service recommendations responsive to the health monitoring data by applying machine fault detection and classification algorithms thereto. A computerized maintenance management system (CMMS) that produces orders and/or requests for service and parts responsive to the industrial machine service recommendations can be included. U.S. Pat. No. 9,199,825B2 relates to a method and apparatus for controlling a machine, such as a crane or other industrial equipment, based on motion-based input to motion sensors such as accelerometers. An input state is selected according to an integrated user input to determine a mapping between motion-based signals, corresponding to motion-based input, and one or more of a plurality of machine control signals provided for controlling the machine. Machine control signals are provided via the mapping when the input state is an operational state, and are not provided via the mapping when the input state is a standby state.

WO2021108680A1 discloses a platform for data collection, monitoring and control system data for industrial Internet of Things (IoT), and also about the use of sensors for collecting a dataset. Further, it also discloses about the various operation modes that can be used for controlling the movement of the working equipment.

CN111874813A discloses a method to establish a model to collect the data of the quay crane reducer in the normal state and different fault states as the training set and test set data. Further, an algorithm is used to establish a decision tree model for the state detection of the quay crane reducer. Furthermore, the dataset is stored in a storage device.

As discussed above working equipment is not always optimally used due to varying daily operational use. By using global or default settings, as often are applied today, the heterogeneity of mobile working equipment operating conditions will cause the equipment to underperform, either because the lifetime of equipment using the operation using the default settings will be much longer than the target lifetime, i.e. the full capacity of the equipment is not used, or because the lifetime of the equipment will be much shorter than the target lifetime due to high wear of structural parts of the equipment. Thus, the object of the present invention is to achieve a more optimal use of working equipment taking advantage of its full capacity.

SUMMARY

The above-mentioned objects are achieved by the present invention according to the independent claims.

Preferred embodiments are set forth in the dependent claims.

The invention addresses the need for reducing stress and strain in a controlled manner. This is achieved by using information derived from the equipment data, quantifying the wear the equipment is subjected to, for determining parameters of automated motion smoothing and control of the equipment's moving parts. Knowing the magnitude of stress and strain, the strength of automated smoothing can be tuned accordingly. The heavier the stress, the more rigorous automated smoothing needs to be, to prevent and reduce damage to the working equipment.

The invention discloses a system and a method for controlling the operation of a working equipment, wherein data sets are received at a monitoring unit. The received data sets are describing an operation mode for controlling movement of the working equipment, operation data based on sensor signals describing the operation performed with the working equipment, predefined equipment data describing said structural parts of the working equipment, a unique identifier for the working equipment and a time stamp with reference to the operation data. The operation mode here describes the degree of damping, or smoothness, in the operating movements of the working equipment. A predicted lifetime of the working equipment is determined, and compared with a target lifetime for the working equipment. Based on the comparison, an operation mode is selected such that the predicted lifetime approaches to the target lifetime, and the selected operation mode is applied when performing a working assignment.

According to an embodiment, an operation mode is selected with a higher degree of damping or smoothness in response to the predicted lifetime being shorter than the target lifetime, or an operation mode is selected with a lower degree of damping or smoothness in response to the predicted lifetime being longer than the target lifetime.

The main advantage of the technical solution is the automated inference of appropriate settings of motion control parameters based on stress and strain exerted on the equipment in its daily operational use. With the current state of the art involving any global or default settings, the heterogeneity of mobile working equipment operating conditions will cause the equipment to underperform, thus leading to poor return of investment (ROI) for both the equipment manufacturer and the equipment owners. The present invention contributes towards optimizing the ROI for both the equipment manufacturer and the equipment owners. The invention allows for automatically setting of motion control parameters that matches the specific operation with the equipment and the expected technical lifetime of the working equipment. This will make sure that a correct trade-off between the applied smoothness or damping in the movements on the one hand and time efficiency in the working procedures on the other hand are made.

Equipment owners and fleet managers would benefit from applying the system and method according to the present invention through (i) an increased level of quality in operations since insufficient motion control does not only cause wear on the working equipment itself but potentially harm to an external object of third party; (ii) assisting new operators or facilitating autonomous maneuvering the equipment, and (iii) either reduce the maintenance needs of the equipment when reducing stress or enabling speedier maneuvers when the motion control would otherwise have slowed down operations.

DETAILED DESCRIPTION

The working equipment system, and the method of the system, will now be described in detail with references to the appended figures. Throughout the figures the same, or similar, items have the same reference signs. Moreover, the items and the figures are not necessarily to scale, emphasis instead being placed upon illustrating the principles of the invention.

First with references to FIGS. 1 and 2, the working equipment system 2 according the present invention will be described in detail.

Figure 1:
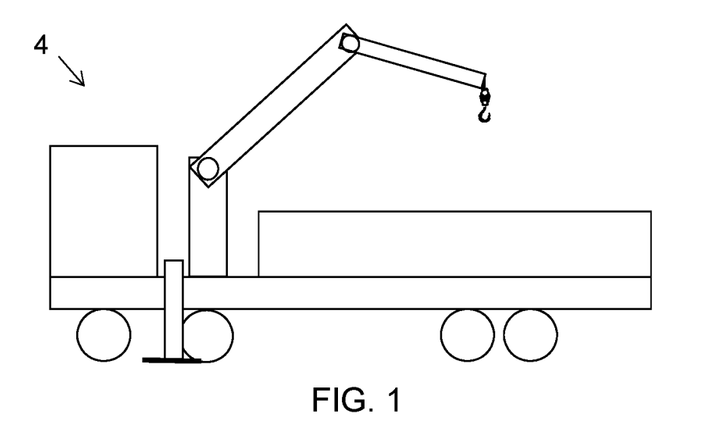
FIG. 1 is a schematic illustration of a working equipment where the present invention may be implemented.
Figure 2:
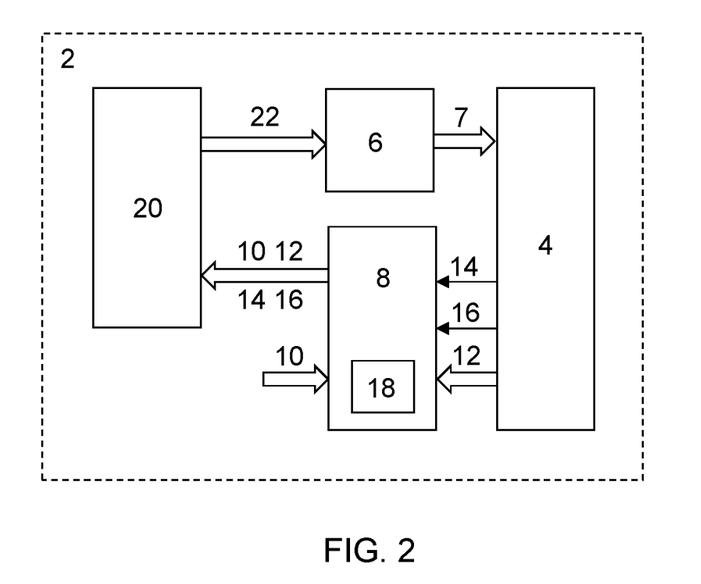
FIG. 2 is a block diagram schematically illustrating the working equipment system according to the present invention.

The working equipment system comprises a working equipment 4, e.g. crane arranged to be mounted to a vehicle, like a loader crane, as illustrated in FIG. 1, including movable structural parts configured to perform a working assignment, e.g. a loading/unloading procedure.

The working equipment system 2 comprises a control unit 6 configured to control the movements of the structural parts when performing a working assignment applying an operation mode. The working equipment system 2 further comprises a monitoring unit 8 configured to receive a first data set 10 comprising predefined equipment data describing the structural parts of the working equipment 4. The monitoring unit 8 is further configured to receive data describing an operation mode for controlling movement of the working equipment 4. The operation mode is defining the degree of damping, or smoothness, in the operating movements of the working equipment 4.

The monitoring unit 8 is further configured to receive a second data set 12 from the working equipment 4, comprising operation data based on sensor signals received by the working equipment 4 during the working assignment and describing the operation performed with the working equipment 4, or a task included in the working assignment. The monitoring unit 8 is also configured to receive a unique identifier 14 for the working equipment 4, and a time stamp 16 for the second data set 12. The monitoring unit 8 is configured to store in a storage system 18 the received first and second data sets 10, 12, the unique identifier 14, and the time stamp 16 for the second data set 12.

The first and second data sets and the data describing the operation mode may be received at the monitoring unit at different points in time or as part of the same data communication. The information in the first data set and the data describing the operation mode might only need to be updated in response to changes. The operation mode may e.g. not only be updated as a consequence by the lifetime analysis described in relation to the present invention but also in response to manual changes initiated by the equipment operator or fleet manager.

Data corresponding to the second dataset may be continuously transmitted or transmitted at set frequencies, it may further be performed in response to availability of a well-functioning mobile connection with the equipment. The data of the second data set may be accumulated or buffered at a database in the equipment or as part of a cloud service. This data may further be used for other purposes like equipment performance evaluations in a fleet and similar.

The working equipment system 2 further comprises a processing unit 20 configured to calculate a time series of wear indicator values based on the stored first and second data sets 10, 12, to estimate a predicted lifetime of the working equipment 4 by extrapolating the calculated time series of wear indicator values, to compare the predicted lifetime with a target lifetime for the working equipment 4, and to select an operation mode for the working equipment 4 in dependence of the result of the comparison.

The operation mode is selected such that the predicted lifetime corresponds to the target lifetime or should approach the target lifetime. The processing unit 20 is configured to transmit the selected operation mode 22 to the control unit 6 that is configured to apply the selected operation mode when performing a working assignment.

According to an embodiment, if the predicted lifetime being shorter than the target lifetime, an operation mode is selected with a higher degree of damping or smoothness . . . , in addition to this an operation mode may optionally be selected with a lower degree of damping or smoothness if the predicted lifetime is longer than the target lifetime. Having a lower degree of damping or smoothness may be an advantage in that the speed of the operation with the working equipment improves.

In a further embodiment the operation mode is defining the degree of damping, or smoothness, by a set of operation parameters used to calculate movement instructions for the working equipment. The operation mode may hence correspond to a predetermined set of operation parameters defined at the relevant units in the system according to the invention. The actual set of operation parameters could as an alternative be transmitted and define the operation mode. There may further be different sets of parameters corresponding to different operation modes and these operation modes may be arranged on a scale corresponding to the level of smoothness or damping they will result in for the working equipment. This allows for selecting a higher or lower degree of damping or smoothness in response to the lifetime analysis according to the invention.

Working equipment may be operated by equipment operator giving operator instructions for how to move structural parts of the equipment, or autonomously operated to perform a specific working task or assignment based on input from sensors and other units. In either case a control unit of the working equipment may calculate movement instructions for the various parts of the working equipment using the operation parameters to achieve the wanted movements defined by the operator instructions or autonomously in accordance with the working task or assignment. The operation parameters may e.g. govern acceleration, speed, how to approach end of the movement range of a structural part etc. of the movement instructions.

Preferably, the movement instructions for the working equipment 4 is part of a semi-autonomous or fully autonomous movement sequence with the movable structural parts.

The processing unit 20 may be configured to select the operation mode from a group of operation modes with predefined sets of operation parameters used to calculate movement instructions for the working equipment, arranged to result in different degrees of damping, or smoothness.

The processing unit 20 may be configured to select the operation mode by adjusting at least one operation parameter used to calculate movement instructions for the working equipment, arranged to result in a different degree of damping, or smoothness.

In a further variation, the processing unit of the working equipment system is configured to select an operation mode for the working equipment based on the comparison of the predicted and target lifetime in response to the system receiving a request from a service technician.

In still another variation, the processing unit of the working equipment system is configured to select a first operation mode based on the comparison of the predicted and target lifetime for the working equipment at a first point in time and a second operation mode based on the comparison of the predicted and target lifetime for the working equipment at a second point in time, wherein the selection of the second operation mode is based on the operation data corresponding to a time period in between the first and second point in time.

The processing unit of the working equipment system may further be configured to select an operation mode for the working equipment at regular intervals (e.g. corresponding to the service interval of service once every ~3-6 months).

According to another embodiment, the target lifetime is calculated as a characteristic lifetime from a fleet of working equipment 4, such as an average, median or other statistical measure representing the lifetime of the working equipment 4 in the fleet.

In one advantageous implementation which is illustrated in FIG. 1, the working equipment 4 is a crane, wherein the movement instructions for the crane are calculated e.g. based on a set of wanted movements of the tip of the crane received from a crane operator. This is sometimes referred to as boom tip control or crane tip control, and allows the operator of the crane to give instructions for the tip of the crane instead of addressing each hydraulic function that controls the position of the tip of the crane (e.g. the slewing of the cranes column, the angle of the first boom, the angle of the second boom, the length of the extensions of the second boom). The control unit of the crane then calculates the operation instructions for each hydraulic function to achieve the wanted crane tip position.

Operation parameters may then be used in these calculations to govern the smoothness or damping in the movements by addressing the speed, acceleration or how end states of the possible movement ranges for each structural part would be approached. There may be further automatic or semi-automatic movements that are initiated and monitored by the crane operator where operation parameters may be used to calculate the movements of the crane. However, having a high degree of smoothening or damping in the movements may be seen as a too time-consuming operation. It is hence important to find the right balance for these operation parameters.

Another type of crane function where the operation mode and its parameters may be applied are for stabilizing the load during movement with the crane. Acceleration, speed and end states are as earlier explained also important for this type of control function.

This disclosure relates to optimizing operation of working equipment to reduce wear of structural parts of the working equipment due to fatigue. Smaller components, e.g. bearings, slide parts, are exchanged at normal services and are thus not included in the structural parts as intended herein. The structural parts of the working equipment are larger parts, hydraulic cylinders, booms, and various mechanical parts.

The stress parameter of the working equipment, as described by the functions called k and s, is calculated following the details in SVENSK STANDARD; SS-EN 280:2013+A1:2015; Approved: 2015-09-01; Published: 2015-09-18; Edition: 1; Language: English; ICS: 14.260; 53.020.99 (pages 98-102).

An estimate of the remaining crane lifetime is computed from these.

In the following relevant parts of the document will be discussed and disclosed in order to provide an understanding of the performed calculations.

The stress histories at a selected point of the structure depend on the loads, their directions and positions during the use of a Mobile Elevating Work Platform (MEWP), herein denoted working equipment, as well as on the MEWP configuration.

It should be noted that MEWPs are one example where the present invention may be implemented. As one example, cranes are structurally similar to MEWPs and thus the MEWP standard is applicable to cranes.

The configuration of the MEWP can be a combination of the different motions of its moving structure, e.g. extension, lowering, slewing. The total number of working cycles of a MEWP during its useful life can be divided into several typical tasks with the numbers of working cycles corresponding to them. The stress histories can be established from those tasks. A task can be characterized by a sequence of intended movements, with specific MEWP configurations, and a load spectrum which can be deduced for a task.

The number of load cycles for a MEWP is usually in the range: from $4\times10^4$=light intermittent duty (e.g. 10 years, 40 weeks per year, 20 h per week, 5 load cycles per h); to $10^5$=heavy duty (e.g. 10 years, 50 weeks per year, 40 h per week, 5 load cycles per h).

Ideally, the corresponding series of loadings has to be determined first, i.e. the magnitude, position and direction of all loads, plus the corresponding configurations of the structure (e.g. extended, lowered/raised, rotated). Next, the sequence of stress peaks occurring during the performance of each task can be deducted.

Stress cycles can be identified from these resulting sequences/stress histories using one of the established stress cycle counting methods, such as the Rainflow or the Reservoir method. The complete stress history of a certain point of the structure is obtained by summating the individual stress histories taken from the sequences of movements of all different tasks. Finally, the stress spectrum factor k can be calculated. It may also be determined from measurements.

Direct calculation of stress history class for MEWPs, the stress spectrum factor k at a certain point of the structure and expressed as relative damage per working cycle, may be computed as:

$$k = \frac{1}{N} \cdot \sum_i \left(\frac{\Delta\sigma_i}{\Delta\sigma_{max}}\right)^3 \cdot n_i$$

and the corresponding stress history parameter s may be calculated as $$s = \frac{N_{tot}}{2\cdot 10^6} \cdot k$$

where i is an index, running from 1 to the number of stress range classes used;

$\Delta\sigma_i$ is the stress range of class i;

$n_i$ is the number of stress cycles that fall into class i;

$\Delta\sigma_{max}$ is the maximum stress range at the point;

N is the number of work cycles used for evaluation of k;

$N_{tot}$ is the number of work cycles during the life of the MEWP.

For MEWPs having an extending structure, and where the stresses only get negligible contributions from other loadings than the rated load and the weight of the work platform, the value of s may be estimated by:

$$s = \sum_i \left[\frac{m_i + w}{m_{rl} + w}\right]^3 \cdot \frac{n_i}{2\cdot 10^6} \cdot \sum_j \left[\frac{r_j}{r_{max}}\right]^3 \cdot \frac{k_j}{N}$$

where:

$m_{rl}$ is the rated load;

$m_i$ is the load level i;

$n_i$ is the number of load cycles at level mi;

w is the weight of the work platform;

$r_j$ is the working radius level j;

$r_{max}$ is the maximum working radius;

$k_j$ is the number of cycles at radius $r_j$;

N is the total number of load cycles.

The smoothness score may as an alternative or in combination with above points be calculated by the processing unit from the received data taking two aspects into account: firstly, the number of overload protection (OLP) activations and secondly the lever activations.

The OLP aspect may be taken into account by calculating the sum of all different OLP activations divided by the number of lifts where any overload protection has been activated.

For the lever activations, may be defined as activating levers on a handset that is used for operating the equipment and the sum of the different lever activations is determined and this sum is divided by the overall number of lifts done within that same timeframe.

Different types of working equipment have different working ranges for movements and operation. For hydraulic equipment the hydraulic pressure of actuators may be used to define and monitor overload. The hydraulic pressures of the actuators and the pattern during operation may be further used for estimating the degree operation and as input for determining an appropriate strength of damping of motion control. This type of motion control (as outlined in relation to the present invention) is automated and integrated to the control unit of the working equipment.

To achieve a sufficient and appropriate level of motion smoothing, the operational specifics of the working equipment need to be considered and used as settings in the control software. Because of the heterogeneity in operating conditions, any default setting of motion control is necessarily imperfect. A system and method according to the invention is enabling that customized settings damping can be done in such a way that it does not (i) slow lift cycles unnecessarily with too heavy damping nor (ii) lead to a reduced equipment lifetime because of insufficient damping.

The present invention also relates to a method of a working equipment system. The system has been described in detail above and it is herein referred to that description. The method will now be described with references to the flow diagram shown in FIG. 4.

Thus, the invention relates to a method of a working equipment system, comprising a working equipment including movable structural parts configured to perform a working assignment.

Figure 4:
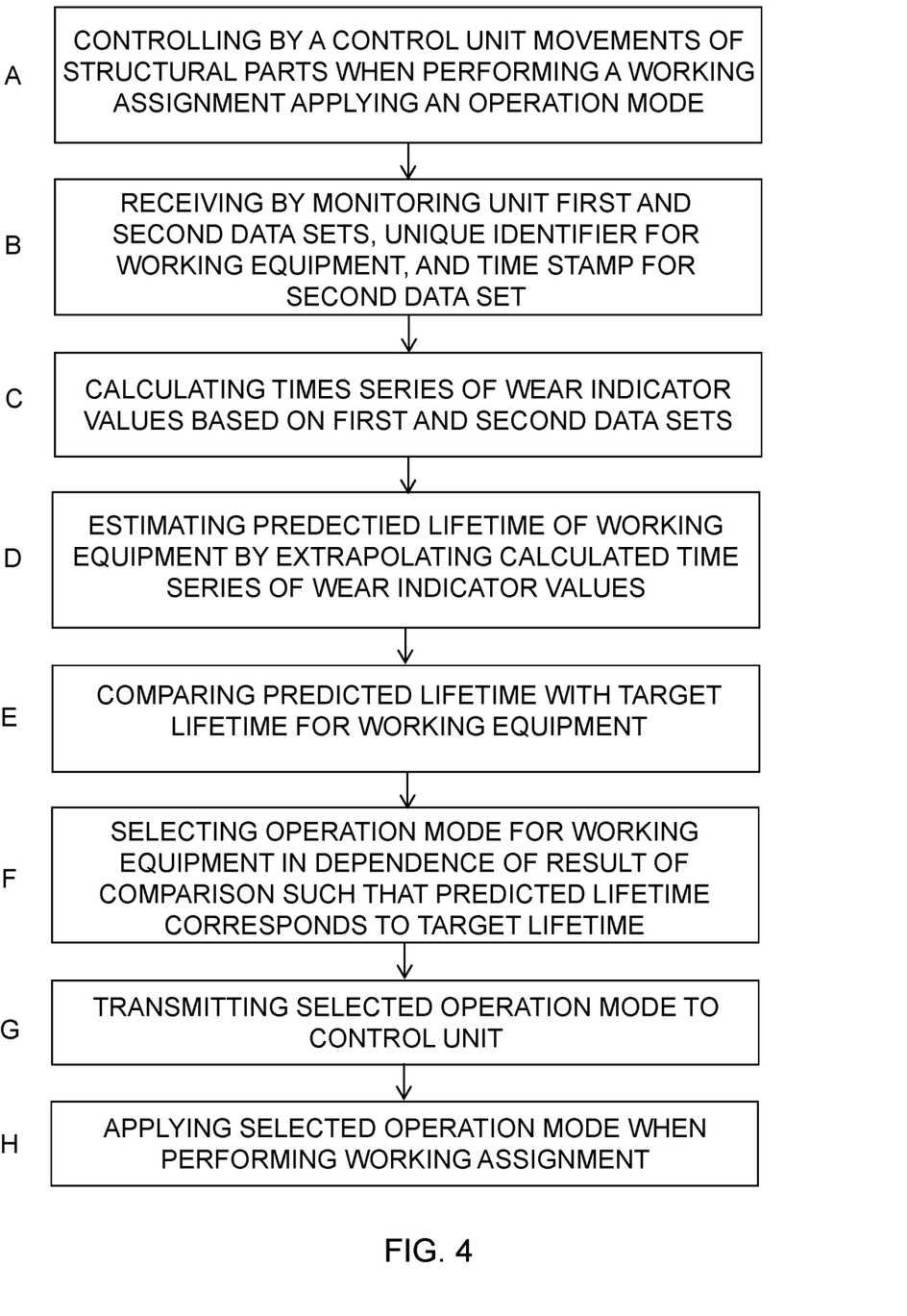
FIG. 4 is a schematic flow diagram schematically illustrating the method according to the present invention.

The method comprises:

A—controlling, by a control unit, the movements of the structural parts when performing a working assignment applying an operation mode, and B—receiving, by a monitoring unit:

a first data set comprising predefined equipment data describing said structural parts of the working equipment, and data describing an operation mode for controlling movement of the working equipment, wherein the operation mode is defining the degree of damping, or smoothness, in the operating movements of the working equipment, a second data set from the working equipment, comprising operation data based on sensor signals received by the working equipment during the working assignment and describing the operation performed with the working equipment (or a task included in the working assignment), and to receive a unique identifier for the working equipment, and a time stamp for the second data set, wherein the monitoring unit is configured to store in a storage system the received first and second data sets, the unique identifier, and the time stamp for the second data set, The method further comprises:

C—calculating a time series of wear indicator values based on the stored first and second data sets;

D—estimating a predicted lifetime of the working equipment by extrapolating the calculated time series of wear indicator values;

E—comparing the predicted lifetime with a target lifetime for the working equipment;

F—selecting an operation mode for the working equipment in dependence of the result of the comparison, such that the predicted lifetime corresponds to the target lifetime;

G—transmitting the selected operation mode to said control unit, and

H—applying said selected operation mode when performing a working assignment.

In the following, some embodiments of the method are listed. These have the same technical features and advantages as for the corresponding features of the system described above. Consequently, these technical features and advantages are not repeated or explained anew in order to avoid unnecessary repetition.

In a further embodiment, if the predicted lifetime being shorter than the target lifetime, an operation mode is selected with a higher degree of damping or smoothness, and if the predicted lifetime being longer than the target lifetime, an operation mode is selected with a lower degree of damping or smoothness.

According to another embodiment, the operation mode is defining the degree of damping, or smoothness, by a set of operation parameters used to calculate movement instructions for the working equipment.

The movement instructions for the working equipment 4 is preferably part of a semi-autonomous or fully autonomous movement sequence with the movable structural parts.

In another embodiment, the target lifetime is calculated as a characteristic lifetime from a fleet of working equipment, such as an average, median or other statistical measure representing the lifetime of the working equipment in the fleet.

Advantageously, the working equipment is a crane and the movement instructions for the crane are calculated based on a set of wanted movements of the tip of the crane received from a crane operator.

A variation of the method according to the invention may be described by using the following steps to infer the optimal motion control settings:

1. Raw data is collected at the working equipment operating system through a range of sensors during the operation of the working equipment.
2. The raw data is buffered at a gateway at the working equipment and sent to the cloud using mobile communications network.
3. The raw data is processed and stored in the cloud. By "cloud" it is referred to an analysis and processing service available through a network such as the internet and that may be distributed on several connected units.
4. The pre-processed data, based on raw data, including time series data of e.g. hydraulic pressures, serves as input for a function calculating a wear indicator value ensuing from the operations performed by the working equipment.
5. The wear indicator values are then used to infer the predicted lifetime of the working equipment by extrapolating the determined trends from the time series data.
6. The output of the wear calculation and the active motion control settings are compared to a benchmark from a fleet of working equipment.
7. Following this comparison, the motion control settings are tuned to either make the control more or less stringent, in order to optimise the usability and lifetime of the equipment.
    a. This may also utilize predefined control profiles, such as "soft", "normal" and "aggressive" control settings.
    b. Alternatively, this may utilize a speed control coefficient that is used in the equipment control algorithms to increase or decrease the speed.
8. Steps 1 to 7 are typically repeated on a regular basis, e.g. when the equipment is in service. The equipment is typically serviced 2 to 4 times per year, so this would not require any additional effort from the equipment owner.
    a. This feedback loop ensures that changes in equipment usage will be taken into account in the control settings.
    b. This feedback loop also corrects possible estimation errors done in the previous settings update.

Figure 3:
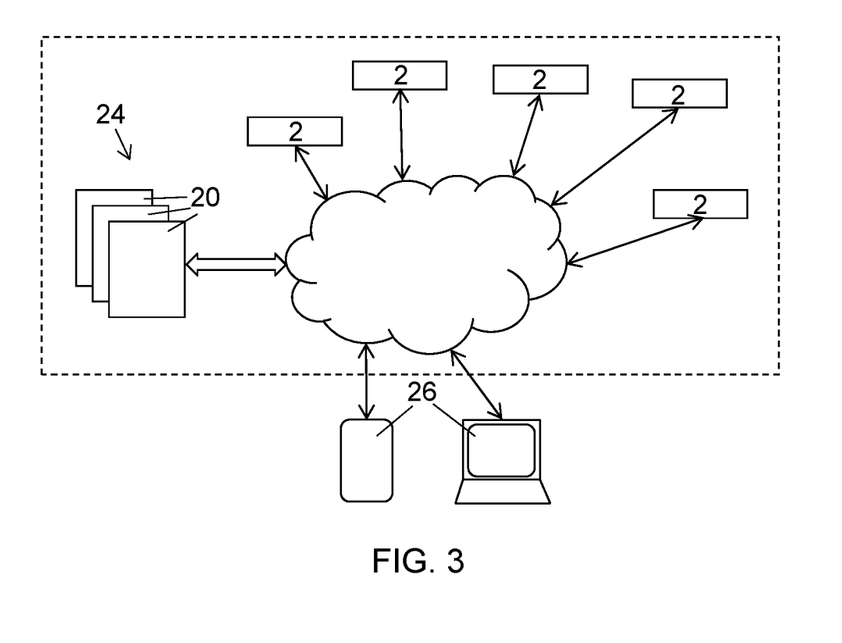
FIG. 3 is a schematic illustration of a monitoring service arrangement applied to implement the working equipment system according to the present invention.

The working equipment system, and the method, according to the invention, may be implemented in a system, which is schematically illustrated in FIG. 3. The system, within the dashed rectangle in FIG. 3, comprises a fleet of working equipment systems 2 as defined in the present disclosure, such as truck mounted loader cranes, but it may also be applied to other working equipment such as hooklifts, skip loaders, tail lifts or forklifts mounted to transport vehicles or stand-alone equipment such as forestry equipment, mobile cranes or excavators.

Each working equipment system 2 in the fleet may be configured to be connected to a common external unit being a monitoring service arrangement 24 for the fleet. The service arrangement 24 comprises at least one processing unit 20. Thus, the processing unit 20 is preferably provided within the monitoring service arrangement 24 as indicated in FIG. 3. Client devices 26, such as mobile phones or computers used by e.g. the fleet owner, may be further connected to and benefit from the data gathered and analysed by the monitoring service arrangement. The service arrangement 24 may be implemented as a cloud service and/or as a service distributed on several processing units 20, and the client devices 26 may use the monitoring service arrangement to monitor the operation performance of the connected working equipment systems. The connection between the working equipment system 2 and the monitoring service arrangement comprises a wireless connection over a network for mobile devices, which is schematically illustrated by the cloud in FIG. 3.

Figure 5:
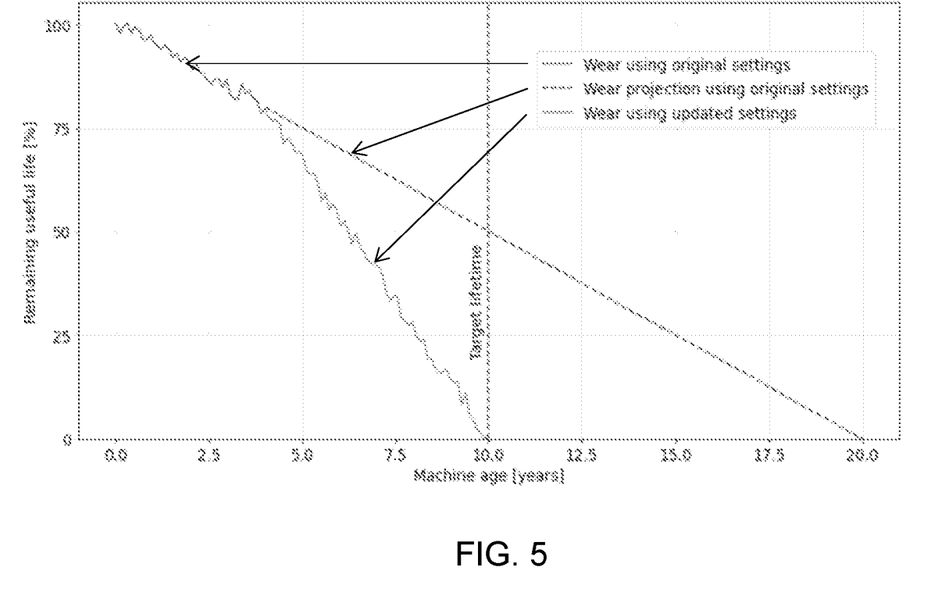
FIGS. 5 and 6 show diagrams illustrating the concept of control setting tuning during the lifetime of the working equipment.
Figure 6:
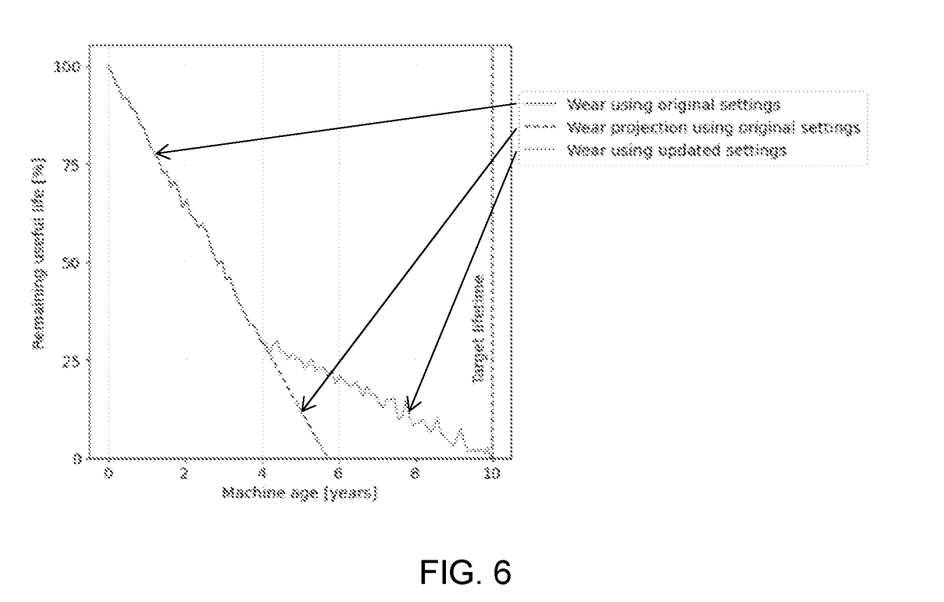

FIGS. 5 and 6 illustrate the concept of control setting tuning during the lifetime of the working equipment.

In FIG. 5 the default parameters are too soft leading to loss of productivity which is indicated by the extrapolated dashed line denoted "wear projection using original settings" resulting in a predicted lifetime of 20 years; thus, the settings can be made more stringent to optimize the productivity which is indicated by the curve denoted "wear using updated settings". This illustrates a typical case of unnecessarily stringent motion control, potentially reducing productivity by slowing down maneuvers executed by the working equipment.

In FIG. 6 the scenario is the opposite, i.e. default parameters are too aggressive for the customer and could lead to premature equipment failure, this case the predicted lifetime is slightly less than 6 years. The figure illustrates a typical case of insufficient motion control, allowing for a high degree of stress and strain such that the lifetime of the working equipment is significantly reduced. In that case the settings are adjusted to the softer direction.

For the sake of simplicity these figures depict only a single adjustment step. In reality the adjustment would be done, e.g. 2 to 4 times per year, effectively tuning the wear and fatigue of the equipment to match the desired lifetime.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A working equipment system, comprising a working equipment including movable structural parts configured to perform a working assignment, the working equipment system comprises:
   a control unit configured to control the movements of the structural parts when performing a working assignment applying an operation mode, and
   a monitoring unit configured to receive
      a first data set comprising predefined equipment data describing said structural parts of the working equipment, and data describing an operation mode for controlling movement of the working equipment, wherein the operation mode is defining the degree of damping, or smoothness, in the operating movements of the working equipment,
      a second data set from the working equipment, comprising operation data based on sensor signals received by the working equipment during the working assignment and describing the operation performed with the working equipment, and to receive a unique identifier for the working equipment, and a time stamp for the second data set, wherein the monitoring unit is configured to store in a storage system the received first and second data sets, the unique identifier, and the time stamp for the second data set,
   wherein said working equipment system further comprises a processing unit configured to calculate a time series of wear indicator values based on the stored first and second data sets, to estimate a predicted lifetime of the working equipment by extrapolating the calculated time series of wear indicator values, to compare the predicted lifetime with a target lifetime for the working equipment, and to select an operation mode for the working equipment in dependence of the result of the comparison, wherein the operation mode is selected such that the predicted lifetime corresponds to the target lifetime, and wherein said processing unit is configured to transmit the selected operation mode to said control unit that is configured to apply said selected operation mode when performing a working assignment.

2. The working equipment system according to claim 1, wherein if the predicted lifetime being shorter than the target lifetime, an operation mode is selected with a higher degree of damping or smoothness, and wherein if the predicted lifetime being longer than the target lifetime, an operation mode is selected with a lower degree of damping or smoothness.

3. The working equipment system according to claim 1, wherein the operation mode is defining the degree of damping, or smoothness, by a set of operation parameters used to calculate movement instructions for the working equipment.

4. The working equipment system according to claim 3, wherein the movement instructions for the working equipment is part of a semi-autonomous or fully autonomous movement sequence with the movable structural parts.

5. The working equipment system according to claim 1, wherein the target lifetime is calculated as a characteristic lifetime from a fleet of working equipment, such as an average, median or other statistical measure representing the lifetime of the working equipment in the fleet.

6. The working equipment system according to claim 1, wherein the working equipment is a crane.

7. The working equipment system according to claim 6, wherein the movement instructions for the crane are calculated based on a set of wanted movements of the tip of the crane received from a crane operator.

8. A method of a working equipment system, comprising a working equipment including movable structural parts configured to perform a working assignment, the method comprises:
   A—controlling, by a control unit, the movements of the structural parts when performing a working assignment applying an operation mode, and
   B—receiving, by a monitoring unit:
      a first data set comprising predefined equipment data describing said structural parts of the working equipment, and data describing an operation mode for controlling movement of the working equipment, wherein the operation mode is defining the degree of damping, or smoothness, in the operating movements of the working equipment,
      a second data set from the working equipment, comprising operation data based on sensor signals received by the working equipment during the working assignment and describing the operation performed with the working equipment (or a task included in the working assignment), and to receive a unique identifier for the working equipment, and a time stamp for the second data set, wherein the monitoring unit is configured to store in a storage system the received first and second data sets, the unique identifier, and the time stamp for the second data set,
   wherein that said method further comprises:
   C—calculating a time series of wear indicator values based on the stored first and second data sets;
   D—estimating a predicted lifetime of the working equipment by extrapolating the calculated time series of wear indicator values;
   E—comparing the predicted lifetime with a target lifetime for the working equipment;
   F—selecting an operation mode for the working equipment in dependence of the result of the comparison, such that the predicted lifetime corresponds to the target lifetime;
   G—transmitting the selected operation mode to said control unit, and
   H—applying said selected operation mode when performing a working assignment.

9. The method according to claim 8, wherein if the predicted lifetime being shorter than the target lifetime, an operation mode is selected with a higher degree of damping or smoothness, and wherein if the predicted lifetime being longer than the target lifetime, an operation mode is selected with a lower degree of damping or smoothness.

10. The method according to claim 8, wherein the operation mode is defining the degree of damping, or smoothness, by a set of operation parameters used to calculate movement instructions for the working equipment.

11. The method according to claim 10, wherein the movement instructions for the working equipment is part of a semi-autonomous or fully autonomous movement sequence with the movable structural parts.

12. The method according to claim 8, wherein the target lifetime is calculated as a characteristic lifetime from a fleet of working equipment, such as an average, median or other statistical measure representing the lifetime of the working equipment in the fleet.

13. The method according to claim 8, wherein the working equipment is a crane.

14. The method according to claim 13, wherein the movement instructions for the crane are calculated based on a set of wanted movements of the tip of the crane received from a crane operator.

\* \* \* \* \*